(12) United States Patent
Haluzak

(10) Patent No.: US 7,018,734 B2
(45) Date of Patent: Mar. 28, 2006

(54) MULTI-ELEMENT THIN-FILM FUEL CELL

(75) Inventor: Charles C. Haluzak, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 498 days.

(21) Appl. No.: 09/917,428

(22) Filed: Jul. 27, 2001

(65) Prior Publication Data

US 2003/0022051 A1    Jan. 30, 2003

(51) Int. Cl.
*H01M 8/02* (2006.01)
*H01M 8/04* (2006.01)
*H01M 8/10* (2006.01)
*H01M 8/24* (2006.01)

(52) U.S. Cl. .............................. 429/32; 429/38; 429/39
(58) Field of Classification Search .................. 429/30, 429/32, 34, 35, 36, 38, 39, 44; 29/623.1, 29/623.4
See application file for complete search history.

(56) References Cited

U.S. PATENT DOCUMENTS

| | | | |
|---|---|---|---|
| 5,300,370 A * | 4/1994 | Washington et al. .......... | 429/34 |
| 5,532,073 A | 7/1996 | Hirata et al. | |
| 5,807,642 A | 9/1998 | Xue et al. | |
| 6,020,083 A | 2/2000 | Breault et al. | |
| 6,083,636 A | 7/2000 | Hsu | |
| 6,149,810 A | 11/2000 | Gonzalez-Martin et al. | |
| 2003/0138685 A1* | 7/2003 | Jankowski et al. ........... | 429/30 |

FOREIGN PATENT DOCUMENTS

| | | | |
|---|---|---|---|
| DE | 19914681 | * | 10/2000 |
| EP | 1258937 | | 11/2002 |
| JP | 2001-236970 A | | 8/2001 |
| WO | WO0045457 | | 8/2000 |
| WO | WO0069007 | | 11/2000 |
| WO | WO 02/080299 A1 | | 10/2002 |

OTHER PUBLICATIONS

Jeffrey D. Morse et al., "Novel Proton Exchange Membrane Thin-Film FUel Cell For Microscale Energy Converstion," J. Vac. Sci. Technol. A 18(4), Jul./Aug. 2000, 0734-2101/2000/18(4), pp. 2003-2005, USA.

* cited by examiner

*Primary Examiner*—Jonathan Crepeau

(57) ABSTRACT

An economical and easy to manufacture miniaturized fuel cell having fuel chambers formed from a substrate, such as a silicon wafer, to define a plurality of elongate fuel chambers in fluid-communication with each other within the substrate. Elongate electrolytes, anodes and cathodes extend along the fuel chambers to maximize the effective electrolyte surface area, thereby increasing the amount of electrical current generated by the fuel cell. The elongate fuel chambers are preferably patterned within the substrate in a mirror image configuration such that two thin-film substrates my be joined together to define fuel chambers having two elongate electrolyte, anode, and cathode portions extending thereal-ong. One or more the fuel cells in accordance with the present invention may be stacked within a suitable frame defining alternative layers of fuel and air (or oxygen) chambers, thereby defining a three-dimensional stack of fuel cells having a relatively small profile, but further increasing the current and/or voltage provided per unit volume.

12 Claims, 4 Drawing Sheets

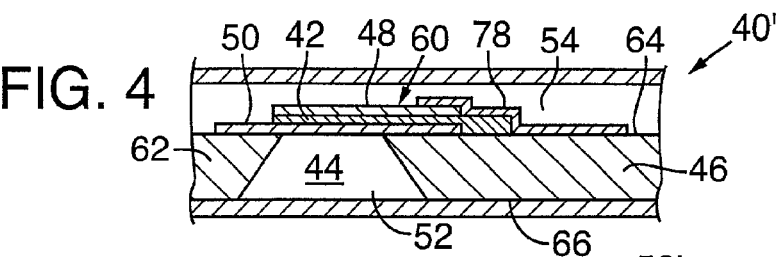
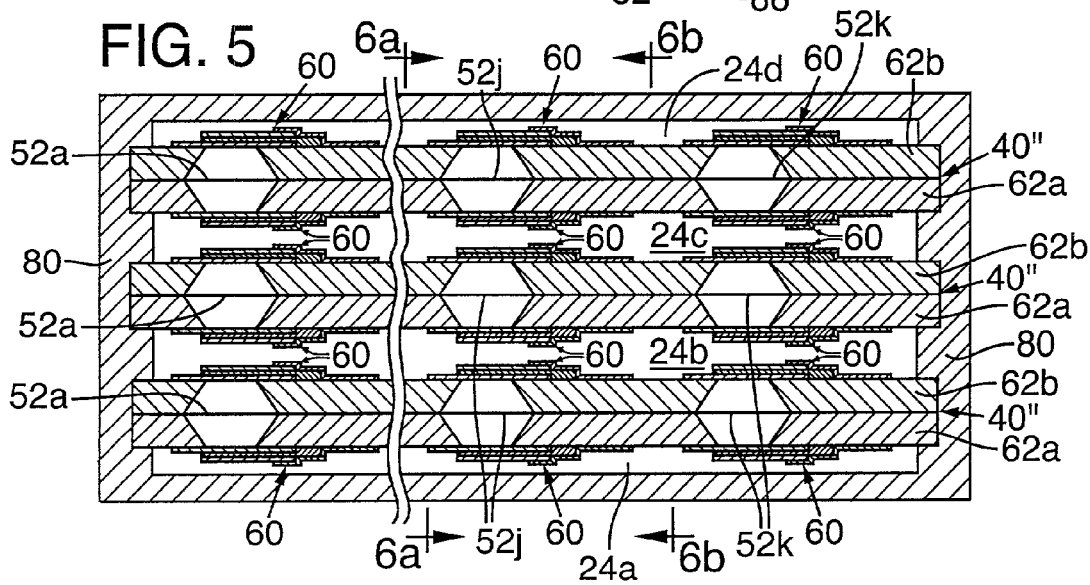
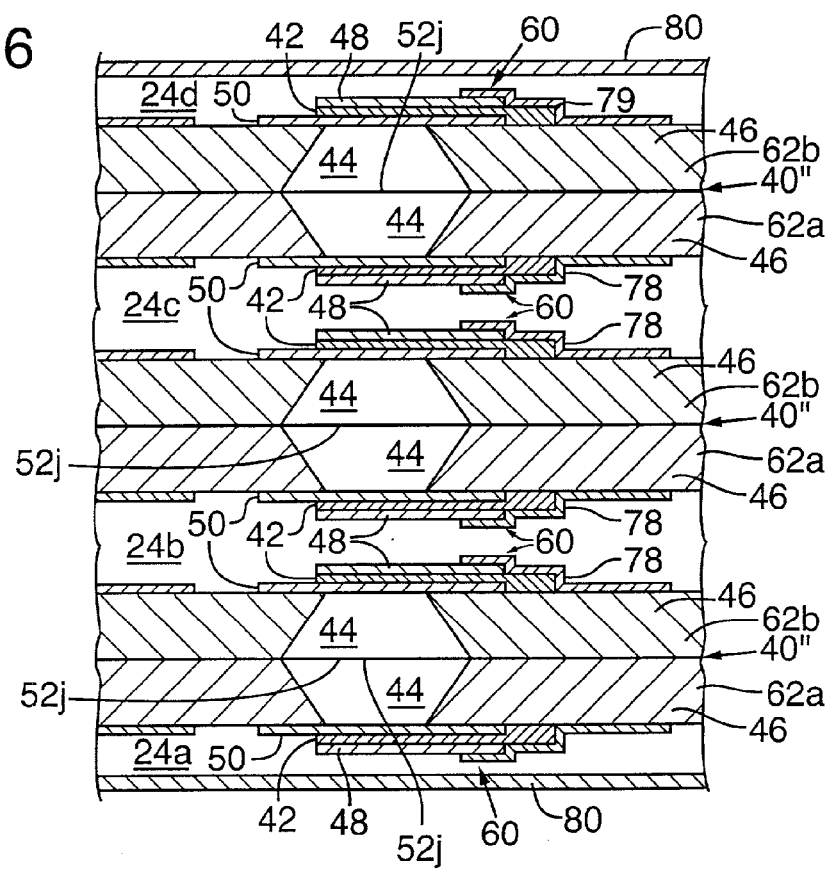

MULTI-ELEMENT THIN-FILM FUEL CELL

TECHNICAL FIELD

This invention relates to a thin-film fuel cell. More particularly, to a thin-film fuel cell that is easy and economical to manufacture and that provides an increased volume of fuel within the thin-film substrate and an increased electrolyte surface area.

BACKGROUND OF THE INVENTION

Fuel cells are electrochemical devices that convert chemical energy of a fuel directly into electrical energy without combustion. Accordingly, they have the potential to offer an environmentally friendly, light-weight, efficient, and renewable power source that make them particularly attractive for use in a wide variety of applications including electric vehicles and portable electronic devices.

Fuel cell operation is generally well understood. The typical fuel cell operates by extending an electrolyte between two electrodes: one operates as a cathode and the other an anode. Oxygen passes over one electrode and hydrogen over the other, generating electricity, water and heat. In particular, the chemical fuel contains hydrogen, which is fed into the anode of the fuel cell. Oxygen (or air) enters the fuel cell through the cathode. Encouraged by a catalyst, the hydrogen atom splits into a proton and an electron, which take different paths to the cathode. The proton passes through the electrolyte, while the electrons create a separate current that can be used before they return to the cathode where they are reunited with the hydrogen and oxygen to form a molecule of water.

There are a wide variety of fuel cells either currently available or under development that use a variety of different fuels and electrolytes. These different types of fuel cells include phosphoric acid, molten carbonate, solid oxide, alkaline, direct methanol, and regenerative fuel cells.

Among these available fuel cells is a type commonly referred to as a Proton Exchange Membrane ("PEM") fuel cell. PEM fuel cells operate at relatively low temperatures, have the potential for high power density, and can vary their output quickly to meet shifts in power demand. According to the United States Department of Energy, "they are the primary candidates for light-duty vehicles, for buildings, and potentially for much smaller applications such as replacements for rechargeable batteries."

The PEM of a PEM fuel cell typically includes porous carbon electrodes, which are platinum loaded to provide a catalyst region which then sandwiches a proton conducting electrolyte material therebetween. The proton conducting electrolyte material is typically a perfluorinated sulfonic acid polymer. Once sandwiched between the electrodes, the membrane-electrode assembly is then heated to cause the electrolyte to impregnate the platinum loaded electrode, as well as form a bond between the layers. The membrane-electrode assembly in then placed in a manifold structure in order to deliver fuel and oxidant to the electrodes.

In order for fuel cells, including PEM fuel cells, to be used in portable electronic devices and as replacements to conventional batteries and the like, they must be compact and light weight, but still provide enough electrical current to power the devices to which they will be used. However, the amount of current generated by these types of fuel cells is proportional to the volume of available fuel and the amount of PEM surface area available to interact with the fuel. Accordingly, in order to make these fuel cells small enough for such applications, the manifold structure must be suitably compact, while the volume of available fuel and related PEM surface area remains large enough to actually produce enough electricity to power the devices to which the fuel cell will be used.

As shown in prior art FIGS. 1 and 2, scientists have had some success in producing miniaturized PEM fuel cells 10 using a conventional silicon wafer 12 as the manifold structure 14. In general, these scientists used conventional thin-film deposition, patterning, and etching processes to define a plurality of cup-shaped chambers 16 within the silicon wafer 12. Each cup-shaped chamber 12 is then filled with a suitable fuel, and the previously described membrane-electrode assembly 18, which preferably has an anode 20, cathode 22, and proton exchange membrane 24, is operably secured to the manifold structure 14 thereby defining an oxygen (or air) region 26 and fuel region 28 divided by the membrane-electrode assembly 18.

These scientists were able to produce electricity from their miniaturized structure. However, its design unnecessarily limits the amount of electricity it can produce and needlessly complicates its manufacture, thereby limiting its usefulness for commercial purposes. For example, the amount of PEM 24 surface area available to interact with the fuel is limited. Moreover, it is difficult and time consuming to initially manufacture and then consistently fill a plurality of cup-shaped chambers 16 with fuel. It is also difficult to ensure uniform flow through all of the available cup-shaped chambers 16 during operation of the fuel cell. Accordingly, known methods for overcoming such difficulties necessarily increase the cost of producing each fuel cell or alternatively limit of the amount of electricity they produce.

SUMMARY OF THE INVENTION

Accordingly, despite the improvements in fuel cell technology, there remains a need for an economical and easy to manufacture miniaturized fuel cell that maximizes the available surface area between the electrolyte and fuel and that facilitates easy filling and dispersion of the fuel within the manifold structure. In addition to other benefits that will become apparent in the following disclosure, the present invention fulfills these needs.

The present invention is a miniaturized fuel cell that includes an electrolyte secured between a cathode and an anode that separates a fuel chamber from an air or oxygen chamber. The fuel chamber is preferably formed from a substrate material, such as a silicon wafer, using conventional thin-film deposition, patterning, and etching processes to define a plurality of elongate fuel chambers in fluid-communication with each other within the substrate. Elongate electrolyte, anodes and cathodes extend along the fuel chambers to maximize the effective electrolyte surface area, thereby increasing the amount of electrical current generated by the fuel cell.

In a preferred embodiment, the elongate fuel chambers are patterned within the substrate in a mirror image configuration such that two thin-film substrates my be joined together to define fuel chambers having two elongate electrolyte, anode, and cathode portions extending therealong. The chambers are preferably in fluid communication with each other, and the fuel may be sealed within the chambers and easily replaced when depleted. Alternatively, a system for continuously replenishing the chambers with fuel can be provided such as with outboard micro-pumps.

One or more of the fuel cells in accordance with the present invention may be stacked within a suitable frame defining alternative layers of fuel and air (or oxygen) chambers, thereby defining a three-dimensional stack of fuel cells having a relatively small profile, but further increasing the current and/or voltage provided per unit volume.

BRIEF DESCRIPTION OF THE DRAWINGS

FIG. 4 is a fragmentary cross-sectional view of the fuel cell of FIG. 3 taken along line 4—4 for FIG. 3.

FIG. 5 is a fragmentary cross-sectional view of a plurality of fuel cells in accordance with a preferred embodiment of the present invention showing possible joining of two fuel cell substrates together to define a set and possible stacking of a plurality of sets of fuel cells in accordance with an alternative preferred embodiment of the present invention.

FIG. 6 is an enlarged fragmentary cross-sectional view of the multiple stacked sets of fuel cells of FIG. 5 taken between lines 6a—6a and 6b—6b of FIG. 5.

DETAILED DESCRIPTION OF PREFERRED EMBODIMENTS

Figure 1:
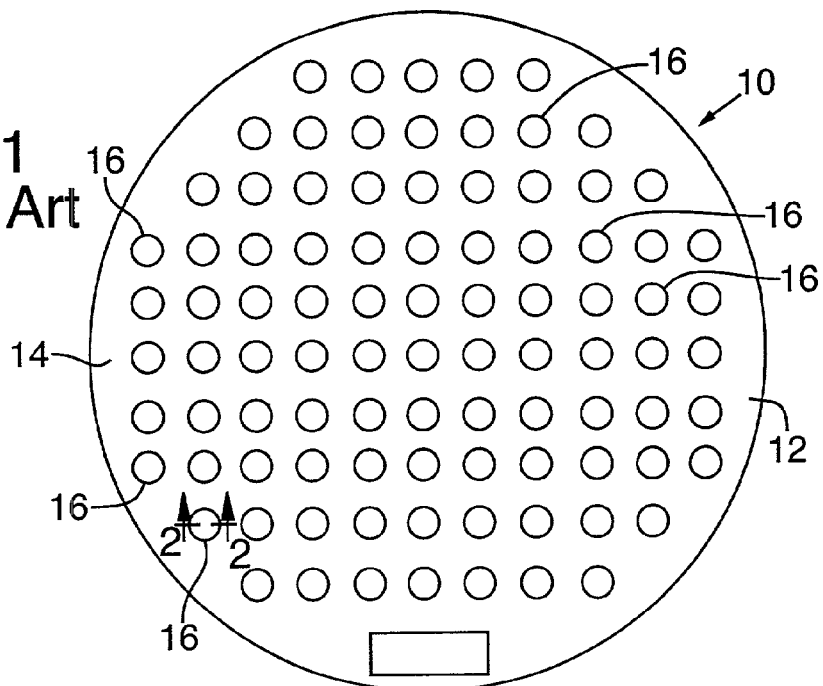
FIG. 1 (PRIOR ART) is a top plan schematic view of a known PEM fuel cell having silicon wafer manifold construction.
Figure 2:
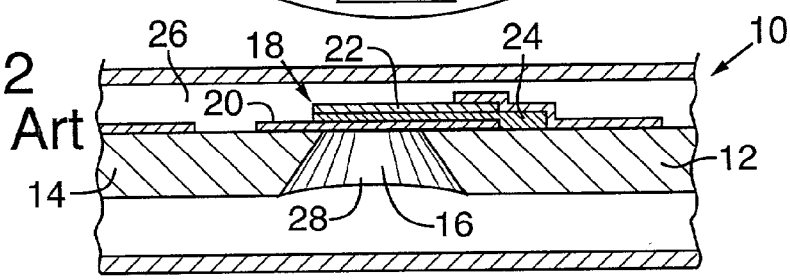
FIG. 2 (PRIOR ART) is a fragmentary cross sectional view of the prior art PEM fuel cell of FIG. 1 taken along line 2—2 of FIG. 1.

An economical and easy to manufacture miniaturized fuel cell 40 that maximizes the available surface area between the electrolyte 42 and fuel 44 and that facilitates easy filling and dispersion of the fuel 44 within the manifold structure 46 is disclosed in FIGS. 3–8.

A. General Construction

As best shown in FIG. 4, the fuel cell 40 includes an electrolyte 42 secured between a cathode 48 and an anode 50 covering a fuel chamber 52, which is received within the manifold structure 46, thereby creating a seal between the an air (or oxygen) chamber 54 and the fuel chamber 52. In a preferred embodiment, the fuel cell 40 is a PEM fuel cell where the cathode 48 and anode 50 are porous carbon electrodes, which are preferably platinum loaded to provide a catalyst region with a proton conducting electrolyte material positioned therebetween defining a membrane-electrode assembly 60. The electrodes are in electrical communication with known structures to allow electrons to flow from the anode 50 and be used as useful electricity before being returned to the cathode 48 where they are reunited with the hydrogen and oxygen to form a molecule of water.

One known effective proton conducting electrolyte material is perfluorinated sulfonic acid polymer, which is obtained in thick film sheets ranging from 50–100 μm in thickness. Once sandwiched between the electrodes, the membrane-electrode assembly 60 is then heated to cause the electrolyte 42 to impregnate the platinum loaded electrodes, as well as form a bond between the air or oxygen chamber 54 and the fuel chamber 52. One known effective fuel 44 received within the fuel chamber 52 is a mixture of methanol and water.

Figure 7:
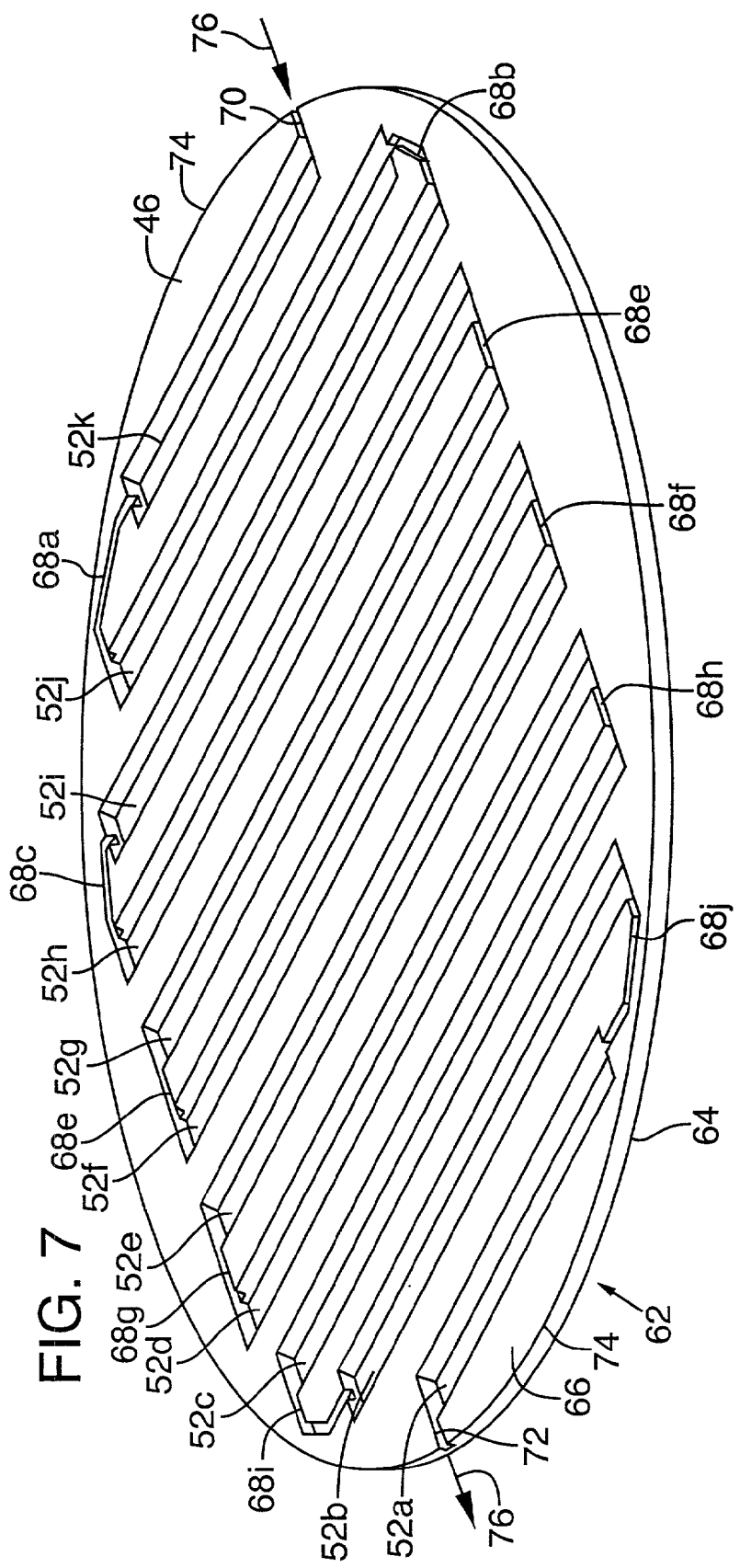
FIG. 7 is an enlarged isometric view of the substrate manifold showing possible fuel chamber orientation in accordance with a preferred embodiment of the present invention.

The fuel chamber 52 is preferably formed from a substrate 62, such as a silicon wafer, using conventional thin-film deposition, patterning, or etching processes. Referring specifically to FIG. 7, the substrate 62 preferably includes a plurality of elongate fuel chambers 52a–k received in the substrate, each fuel chamber in fluid-communication with the others. In particular, each fuel chamber 52a–k is an elongate trench, preferably formed by anisotropic wet or dry etching techniques, that extends through the substrate 62 from one face surface 64 to the opposite back surface 66. More shallow trenches 68a–j, which are preferably formed though an anisotropic Deep Reactive Ion Etching ("DRIE") technique, do not extend through the substrate 62 but extend between the fuel chambers 52a–k placing the fuel chambers 52a–k in fluid communication with each other.

Figure 8:
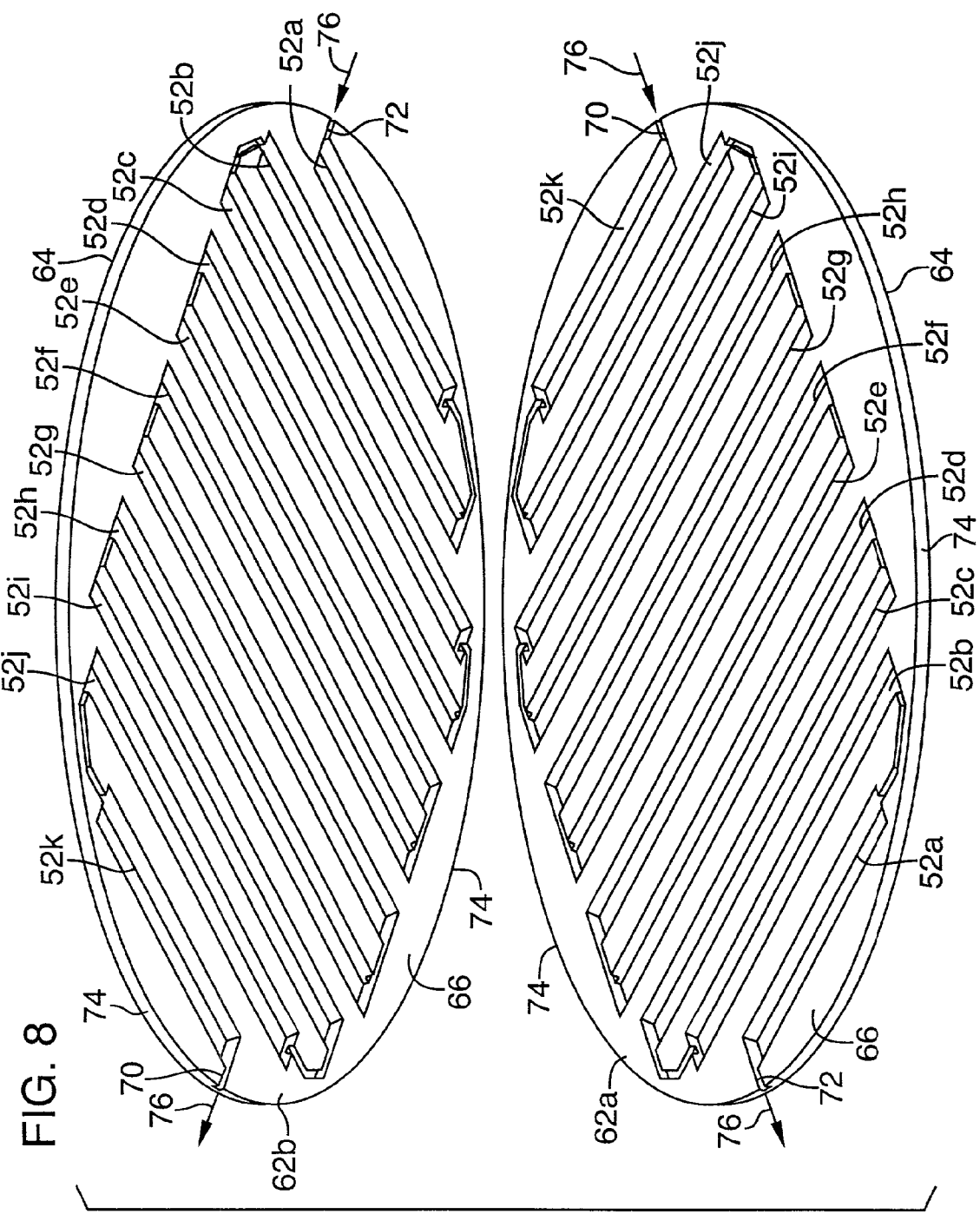
FIG. 8 is an enlarged, exploded, isometric view of two substrate manifolds of FIG. 7 one inverted and stacked upon the other to show possible alignment of the fuel chambers which are in a mirror image configuration in accordance with a preferred embodiment of the present invention.

Preferably, a filling trench 70 and a draining trench 72 extend from the outer edge 74 of the substrate to one of the fuel chambers 52a, 52k, respectively, and the shallow trenches 68a–j are placed on alternating ends between the chambers 52a–k as shown thereby defining a serpentine fluid path from the filling trench 70 through the all the fuel chambers 52a–k on the substrate 62 to the draining trench 72 along arrows 76. Alternatively, parallel configurations may be used for balancing flow of the fluid and balancing chemical reactions therein. More preferably, the fuel chambers 52a–k are patterned within the substrate 62 in a mirror image configuration such that one substrate 62b (FIG. 8) may be inverted and placed back-to-back on another substrate 62a (FIG. 8) so that the fuel chambers 52a–k and trenches 68a–j align as shown in FIG. 8.

Figure 3:
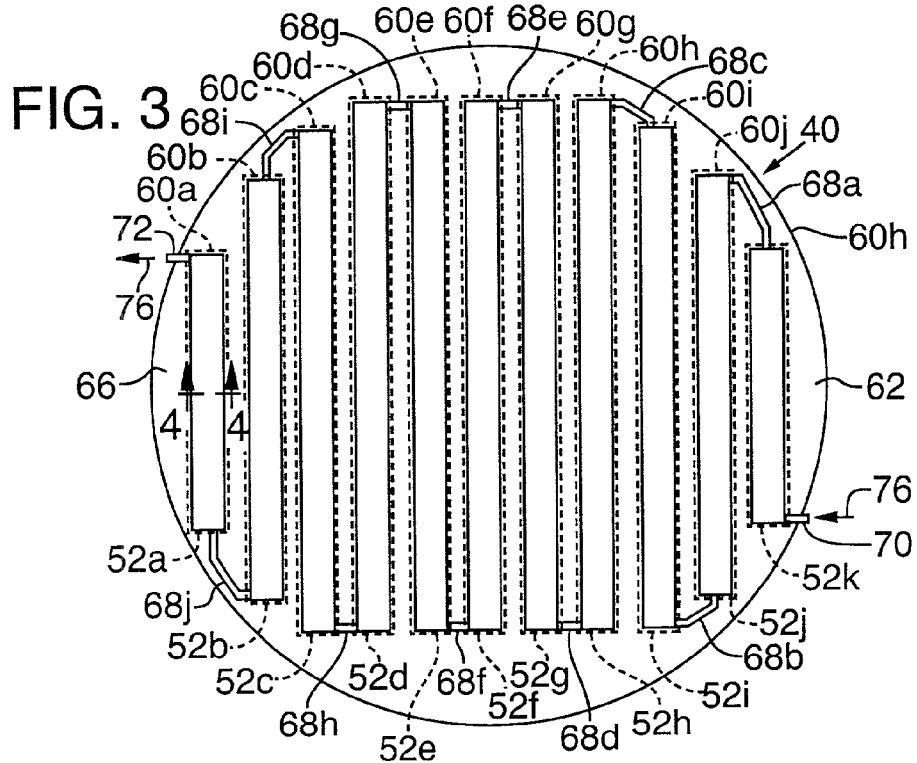
FIG. 3 is a top plan schematic view of a fuel cell in accordance with a preferred embodiment of the present invention.

The membrane-electrode assembly 60 is built onto to the manifold structure 46 with know methods such as Complimentary Metal Oxide Semiconductor ("CMOS")-type processes, thereby operably sealing the air chamber 54 from the fuel chambers 52a–k. In particular, there are a plurality of membrane-electrode assemblies 60a–k, each membrane-electrode assembly is elongated and sized to cover the opening in a fuel chamber 52a–k, respectively, at the face surface 64 of the substrate 62 as best shown in FIGS. 3 and 4. The electrodes are in electrical communication with each other and oriented in desirable combinations of parallel and series connections to obtain desirable current and voltage. Preferably, a gold bond pad 78 is operably secured to the membrane-electrode assembly 60 to allow the assembly to be placed into electrical communication with other components.

B. Single Manifold Structure Fuel Cell

A single manifold structure fuel cell 40' is disclosed in FIG. 4. It includes the single thin-film substrate 62 of FIG. 7 having membrane-electrode assemblies 60a–k, one covering each opening of the fuel chambers 52a–k, respectively, on the face surface 64 of the substrate 62. The back face 66 can be sealed as shown in FIG. 4. Alternatively, the opening from the fuel chambers 52a–k on the back face 66 can lead into a sealed fuel plenum (not shown).

After the single manifold structure fuel cell 50' is assembled, fuel 44 is added to the fuel chambers 52a–k with known methods. For example, a fuel delivery tube (not shown) can be inserted into the filling trench 70 and fuel 44 pumped through it. Air in the fuel chambers 52a–k is displaced through the draining trench 72 as fuel 44 enters each chamber 52a–k. The serpentine fluid path defined by the orientation of the fuel chambers 52a–k and interconnecting shallow trenches 68a–j ensures that each fuel chamber 52a–k is filled easily and to capacity during the filling process.

When all of the fuel chambers 52a–k are filled with fuel 44, the filling trench 70 and draining trench 72 are sealed with known devices such as UV or heat curable epoxy (not shown), detachably or rigidly secured plugs (not shown), or the like. Alternatively, a system for continuously replenishing the fuel chambers 52a–k with fuel 44 can be provided. For example, macro/meso-scale delivery tubes could be secured with adhesive or o-ring type structures to the filling and draining tubes, with the delivery tubes in fluid communication with a plenum of fuel that is continuously circulated through the fuel chamber 52a–k.

Because of the elongate fuel chambers 52a–k and corresponding elongate membrane-electrode assemblies 60a–k, the surface area between the fuel 44 and electrolyte 42 is increased over substrate manifold cup-shaped fuel chamber designs, thereby increasing the electrical capacity of the fuel cell.

C. Dual Manifold Structure Fuel Cell

A dual manifold structure fuel cell 40" is disclosed in FIGS. 5, 6 and 8. It includes two single thin-film substrates 62 of FIG. 7, with one inverted 62b (FIG. 8), and the two substrates 62a, 62b (FIG. 8) placed back-to-back on each other so that the fuel chambers 52a–k and trenches 68a–j align as shown in FIG. 8. The face surfaces 64 of each substrate 62a, 62b include membrane-electrode assemblies 60a–k, one covering each opening of the fuel chambers 52a–k, respectively, on the first face 64 of each substrate 62a, 62b. Accordingly, as best shown in FIG. 6, each fuel chamber includes two membrane-electrode assemblies 60, one on each face 64 of the substrates 62a, 62b.

The back surfaces 66 of each substrate 62a, 62b are bonded together with known methods such as Si—SiO2/Si—Si thermal/pressure, wet, or anodic bonding, or special techniques such as low temperature plasma-activated wafer bonding. One known effective and commercially available low-temperature plasma-activated wafer bonding technique is provided by the Silicon Genesis Corporation of Campbell, Calif., United States of America. Alternatively, ultraviolet or thermally activated glues or photo resist bonding or solder bump bonding may be used. This bond between the substrates 62a, 62b should not require highly accurate placement tolerance, but must act as an impenetrable barrier that prevents fuel 44 within the fuel chambers 52a–52k from leaking or otherwise diffusing with air.

After the dual manifold structure fuel cell 40" is assembled, fuel 44 is added to the fuel chambers 52a–52k with known methods, such as those previously discussed with respect to the single manifold structure fuel cell 40'. The serpentine fluid path defined by the orientation of the fuel chambers 52a–k and shallow trenches 68a–j connecting them ensure that each fuel chamber 52a–k is filled easily and to capacity during the filling process.

When all of the fuel chambers 52a–k are filled with fuel, the filling trench 70 and draining trench 72 are sealed with known devices such as UV or heat curable epoxy (not shown), detachably or rigidly secured plug (not shown), or the like. Alternatively, a system for continuously replenishing the chambers 52a–k with fuel 44 can be provided. For example, macro/meso-scale delivery tubes could be secured with adhesive or o-ring type structures to the filling and draining tubes, with the delivery tubes in fluid communication with a plenum of fuel that is continuously circulated through the fuel chambers 52a–k. Alternatively, hermetically sealing to a pre-machined plenum block of a thermoplastic such as poly-methyl-methacrylate ("PMMA") can complete the seal(s) and act as a manifold.

Because of the elongate fuel chambers 52a–k and corresponding elongate membrane-electrode assemblies 60a–k and the fact that each fuel chamber 52a–k includes two such elongate membrane electrode assemblies 60a–k, the surface area between the fuel 44 and electrolytes 42 is increased over single-substrate manifold cup-shaped fuel chamber designs. Accordingly, electrical capacity of the fuel cell is maximized while the overall size of the fuel cell is minimized.

D. Three-Dimensional Stack of Fuel Cells

As best shown in FIGS. 5 and 6, single or dual manifold structure fuel cells 40', 40" (40" shown in FIGS. 5 and 6) in accordance with the present invention may be stacked within a suitable frame 80 defining alternative layers of fuel and air (or oxygen) chambers, thereby defining a three-dimensional stack of fuel cells 40' or 40" (40" shown in FIGS. 5 and 6) having a relatively small profile, but further increasing the current and/or voltage provided.

In particular, the frame 80 is substantially rigid and sized to receive the single or dual manifold structure fuel cells 40', 40" respectively, therein such that the fuel cells 40" are spaced-apart from each other defining the air chambers 54a–d between the stacked fuel cells 40". The frame 80 is constructed of a suitable material to withstand the maximum temperature to be achieved by the fuel cells 40" during operation. Known effective materials for PEM fuel cells include temperature resistant thermoplastic and ceramics. Preferably, the frame 80 encloses the fuel cells 40" to protect them from inadvertent contact. However, the frame 80 itself need not necessarily be air tight as any leakage from the air chambers 54a–d will most likely be harmless air.

The electrodes of the plurality of stacked fuel cells 40" are in electrical communication with each other and oriented in desirable combinations of parallel and series connections to obtain desirable current and voltage. Similarly, the fuel chambers 52a–k of the plurality of stacked fuel cells 40" may be in fluid communication with each other with known devices extending from them. For example, the macro/meso-scale delivery tubes could be secured to the filling and draining tubes of each fuel cell 40", with the delivery tubes in fluid communication with a common plenum of fuel that is continuously circulated through the fuel chambers.

Alternatively, the fuel chambers 52a–k of each fuel cell 40" may be in series fluid communication with each other such that a continuous serpentine fluid path runs from the filling trench 70 of a first fuel cell in the stack through all of the fuel chambers 52a0k in the stack of fuel cells 40" to the draining trench 72 of a last fuel cell in the stack. Such a serpentine fluid path facilitates easy filling and refilling of the fuel chambers in the stack of fuel cells 40".

E. Alternative Embodiments

Even though the foregoing description has focused on the production of PEM fuel cells, it can be appreciated that the basic concepts of this invention will work equally well with other types of fuel cells including phosphoric acid, molten carbonate, solid oxide, alkaline, direct methanol, and regenerative fuel cells. Moreover, the selected fuel may be a liquid, gas, or solid.

Also, to assist understanding of the basic concepts of this invention, the fuel cells have been shown as being constructed on a complete silicon wafer. Those skilled in the art can appreciate that the fuel cell and its related fuel chambers can be constructed on a much smaller scale, including being placed entirely onto one die of a conventional silicon wafer.

Similarly, the bonding of the two fuel cell substrates together as previously described can be limited to bonding individual silicon die together.

In addition, although silicon is a preferred substrate 62, other known substrates such as PMMA, plastics, and ceramic materials may be used depending on the type of fuel to be used in the fuel cell and the expected operating temperature of that particular fuel cell. Also, a multi-layer ceramic ("MLC") that allows both fluid and electrical interconnections, such as those sold by the Kyocera Corporation of Kyoto, Japan, can be useful as fuel chambers for a plurality of stacked fuel cells. In cases where the substrate is ceramic or plastic the fuel chambers and related fluid paths may be molded or machined into the materials.

Thus, having here described preferred embodiments of the present invention, it is anticipated that other modifications may be made thereto within the scope of the invention by individuals skilled in the art. Thus, although preferred and alternative embodiments of the present invention have been described, it will be appreciated that the spirit and scope of the invention is not limited to those embodiments, but extend to the various modifications and equivalents as defined in the appended claims.

I claim:

1. A thin-film fuel cell device, comprising:
    a substrate defining a plurality of elongate fuel chambers, with respective elongate fuel chamber openings, connected to one another in series; and
    a plurality of elongate fuel cells, including respective anodes and cathodes, secured to the substrate and positioned over respective elongate fuel chamber openings such that the anodes face the elongate fuel chambers and the cathodes are hydraulically isolated from the elongate fuel chambers.

2. A thin-film fuel cell device as claimed in claim 1, wherein the substrate comprises a silicon wafer.

3. A thin-film fuel cell device as claimed in claim 1, wherein the substrate comprises a portion of a silicon wafer.

4. A thin-film fuel cell device as claimed in claim 1, wherein the elongate fuel cells comprise elongate proton exchange membrane fuel cells including a proton conducting electrolyte material between the anodes and cathodes.

5. A thin-film fuel cell device as claimed in claim 4, wherein the proton conducting electrolyte material comprises a perfluorinated sulfonic acid polymer having a thickness between 50–100 μm.

6. A thin-film fuel cell device as claimed in claim 1, wherein the plurality of elongate fuel chambers define respective longitudinal ends and are connected to one another at the longitudinal ends.

7. An apparatus, comprising:
    a first thin-film fuel cell device including
        a first substrate defining a plurality of first elongate fuel chambers, with respective elongate front and back fuel chamber openings, connected to one another in series, and
        a plurality of first elongate fuel cells, including respective anodes and cathodes, secured to the first substrate and positioned over respective elongate front fuel chamber openings such that the anodes face the first elongate fuel chambers and the cathodes are hydraulically isolated from the first elongate fuel chambers; and
    a second thin-film fuel cell device including
        a second substrate defining a plurality of second elongate fuel chambers, with respective elongate front and back fuel chamber openings, connected to one another in series, and
        a plurality of second elongate fuel cells, including respective anodes and cathodes, secured to the second substrate and positioned over respective elongate front fuel chamber openings such that the anodes face the second elongate fuel chambers and the cathodes are hydraulically isolated from the second elongate fuel chambers;
    wherein the first and second substrates are bonded to one another such that the first and second elongate back fuel chamber openings are aligned with one another.

8. An apparatus as claimed in claim 7, wherein at least one of the first and second substrates comprises a silicon wafer.

9. An apparatus as claimed in claim 7, wherein at least one of the first and second substrates comprises a portion of a silicon wafer.

10. An apparatus as claimed in claim 7, wherein the first and second elongate fuel cells comprise elongate proton exchange membrane fuel cells including a proton conducting electrolyte material between the anodes and cathodes.

11. An apparatus as claimed in claim 10, wherein the proton conducting electrolyte material comprises a perfluorinated sulfonic acid polymer having a thickness between 50–100 μm.

12. An apparatus as claimed in claim 7, wherein
    the plurality of first elongate fuel chambers define respective longitudinal ends and are connected to one another at the longitudinal ends; and
    the plurality of second elongate fuel chambers define respective longitudinal ends and are connected to one another at the longitudinal ends.

\* \* \* \* \*